United States Patent Office 3,580,930
Patented May 25, 1971

3,580,930
PROCESS FOR PRODUCING GAMMA-BUTYROLACTONE
Bunji Miya, Fumiro Hoshino, and Morio Matuda, Wakayama, Japan, assignors to Kao Soap Co., Ltd., Tokyo, Japan
No Drawing. Filed Dec. 27, 1967, Ser. No. 693,744
Claims priority, application Japan, Dec. 29, 1966, 42/453
Int. Cl. C07d 5/06
U.S. Cl. 260—343.6          6 Claims

ABSTRACT OF THE DISCLOSURE

A process for producing gamma-butyrolactone by hydrogenating maleic anhydride, maleic acid, fumaric acid, succinic anhydride or succinic acid or mixtures thereof, in the gas phase, in the presence of a Zn-Cu-Cr catalyst, in order to produce high yields of gamma-butyrolactone and minimize the formation of by-products.

BACKGROUND OF THE INVENTION

This invention relates to an improved process for producing gamma-butyrolactone by catalytically hydrogenating, in the gas phase, maleic anhydride, maleic acid, fumaric acid, succinic anhydride or succinic acid or mixtures thereof.

DESCRIPTION OF THE PRIOR ART

Generally, gamma-butyrolactone can be produced by hydrogenating and dehydrating 2-butyne-1,4-diol obtained by Reppe's reaction. However, there have been suggested several methods for directly producing gamma-butyrolactone by hydrogenation of maleic anhydride or its derivatives. No economically advantageous process has been discovered for obtaining gamma-butyrolactone selectively and at a high yield.

An example of hydrogenating, in the gas phase, maleic acid, succinic acid or their anhydrides or esters with copper chromite catalysts is shown in U.S. Pat. No. 3,065,-243 wherein, by using a mol ratio of hydrogen to the material to be hydrogenated of 100:1, gamma-butyrolactone was obtained at a yield of 88.1 percent from succinic anhydride and at a yield of 79.9 percent from maleic anhydride mixed with butanol with 17.6 percent succinic anhydride as a by-product. In U.S. Pat. No. 3,113,138, the hydrogenation reaction was carried out in lower alkyl acetate or dioxane solvent by using a palladium catalyst supported by active carbon or active alumina and a corresponding fraction was obtained from a topped reaction product, but the yield based on the charged acid was not so high. Further, such a catalyst is expensive.

In Japanese patent publication No. 4,461/1964, a nickel catalyst was treated with inert gas and maleic anhydride was hydrogenated in the liquid phase in the presence of said catalyst to obtain butyrolactone at a yield of 60 to 80 percent, but a distillation residue containing a considerable amount of succinic acid was by-produced.

SUMMARY OF THE INVENTION

We have discovered a novel process for obtaining a gamma-butyrolactone selectively and at high yields by hydrogenating maleic anhydride, maleic acid, succinic anhydride, succinic acid or fumaric acid or mixtures thereof in the presence of a novel hydrogenating catalyst.

The hydrogenating catalyst to be used in the process of the present invention is a Zn-Cu-Cr catalyst having a specific composition as hereinafter defined. The catalyst has the features that it will give gamma-butyrolactone at high yields and it has a very long active life. By investigating this catalyst by an X-ray diffraction method, it has been found that Cu will be present in the metallic state but that Zn and Cr will not be present in the state of simple oxides but probably will be present in the form of a double salt thereof. This catalyst can be formed by a reaction of a zinc compound, such as zinc carbonate, zinc hydroxide, zinc oxide and mixtures thereof, with chromium trioxide and a copper salt through conventional steps of catalyst preparation including formation of a precipitate, washing, drying, crushing, roasting and reduction. The ratio of these compounds to be charged in producing the catalyst should be 3 mols of Zn, 1 to 10 mols of Cu and 0.5 to 10 mols of Cr, preferably 3 mols of Zn, 2 to 8 mols of Cu and 1 to 4 mols of Cr, calculated as the metals.

The above-mentioned zinc compound can be obtained as a precipitate from the reaction of aqueous solutions of soluble zinc salts, such as zinc sulfate of zinc nitrate, with caustic alkali or alkali carbonate. The precipitate can be used as it is without drying. Soluble copper salts, such as copper sulfate and copper nitrate, can be used as the above-mentioned copper salt. In the reaction for producing the precipitate from the above-mentioned zinc, copper and chromium compounds during the course of preparation of the catalyst, the order of adding the compounds other than the zinc compound can be freely changed. Further, the copper salt or chromium trioxide may also be added after the respective steps of water-washing, drying, crushing and roasting.

It can be considered that, when zinc carbonate and a soluble copper salt are made to react with each other, the following reaction will occur:

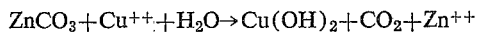

$$ZnCO_3 + Cu^{++} + H_2O \rightarrow Cu(OH)_2 + CO_2 + Zn^{++}$$

The $Zn^{++}$ may be removed by washing with water or it may be precipitated as $Zn(OH)_2$ with an alkali, such as NaOH. If zinc sulfate and copper sulfate are used, the addition of NaOH will be indispensable for the formation of a precipitate and the amount of NaOH should be 0.5 to 4 equivalents to Cu. In case the nitrate salts are used, NaOH need not be added.

Further, as the precipitate is being formed, a carrier substance may be added, if necessary.

The precipitate produced will then be water-washed, dried, crushed, roasted, mixed with a small amount of proper lubricant such as graphite, pressure-molded in a tablet molder and then put into a reactor. The roasting may be carried out after the molding. The molded catalyst in the reactor will first be gradually reduced with hydrogen rich in nitrogen. The hydrogen concentration will be gradually increased and finally the reduction of the catalyst will be completed with hydrogen only. The catalyst will be used in this reduced form for the reaction of this invention.

In the process of this invention the starting material selected from maleic anhydride, maleic acid, succinic anhydride, succinic acid, fumaric acid and mixtures thereof, in the vapor phase, is mixed with hydrogen in a mol ratio of starting material: hydrogen=1:5 to 1:100, preferably 1:10 to 1:30. The mixture is passed into the reactor in which the catalyst is present and is heated to 180° to 350° C., preferably 240° to 300° C.

If starting materials having a double bond, such as maleic anhydride, maleic acid or fumaric acid, are used, a large amount of heat will be generated in the hydrogenation reaction. Therefore, the reaction is preferably carried out in two steps so that the double bond is saturated in the first step and the material is lactonated in the second step in order to easily control the reaction. In this case the first step of the reaction may be carried out at 180° to 290° C. or preferably 220° to 260° C. The second step may be carried out at 220° to 330° C., preferably 260° to 310° C. The average staying time during which the mixture of the starting material vapor and hydrogen is in contact with the catalyst will preferably be from 0.5 to 10 seconds. If the reaction time is made too long, not only a large reactor will be required but also the produced butyrolactone will be further converted to tetrahydrofuran and butanol and, therefore, it will not be desirable. The pressure in the hydrogenating reaction zone will be generally 0.1 to 5 kg./cm.$^2$. If the pressure is less than 2 kg./cm.$^2$, particularly favorable results will be obtained.

EXAMPLE 1

377 g. (3 mols) of zinc carbonate were added to 0.5 liter of water and stirred. An aqueous solution prepared by dissolving 100 g. (1 mol) of chromium trioxide in 0.5 liter of water was dropped into the zinc carbonate solution. Further, a solution prepared by dissolving 976 g. (4 mols) of copper nitrate in 1.0 liter of water was dropped into the zinc carbonate-chromium trioxide solution during about one hour at 40° C. and was made to react until no more carbon dioxide was produced. The precipitate produced was washed three times, each with three liters of water, dried at 120° C., then crushed and roasted at 450° C. for three hours. The yield was 266 g. Four percent graphite was mixed into the product and the mixture was molded into tablets 4 mm. in diameter.

260 g. of this molded catalyst were put into a reaction tube having an inside diameter of 20 mm. and a charging capacity of 160 ml. First, the temperature was elevated to 170° C. while nitrogen was made to flow through the reaction tube under a pressure of 0.5 kg./cm.$^2$. Then, a mixture of nitrogen and hydrogen in a volume ratio of 1:30 was passed therethrough at a volumetric rate of 100 liters per hour. The temperature was elevated to 190° C. over a period of five hours and the catalyst was reduced. Finally, only hydrogen was passed through the reaction tube at a volumetric rate of 130 liters per hour, the temperature was elevated to 225° C. over a period of one hour and the reduction was completed.

A mixed gas of a mol ratio of succinic anhydride to hydrogen of 1:17 was passed through the above-mentioned charged reaction tube at a reaction temperature of 285° C. under a reaction pressure of 1.0 kg./cm.$^2$ for an average staying time of 2.0 seconds. The amount of succinic anhydride passed into the reaction tube over a period of 45 minutes was 52.0 g. The product contained 37.1 g. of butyrolactone and the production rate (yield) was 83 percent (of the theoretical value). The ratio of butyrolactone to the converted succinic anhydride or the selection rate was 95 percent.

When the staying time was 1.0 second, the production rate of butyrolactone was 66 percent and the selection rate was 97 percent.

When a catalyst was prepared by using an equivalent of zinc oxide, instead of zinc carbonate, in the above example, substantially the same results were obtained.

When an Adkins type copper chromite catalyst prepared by a conventional method was used under the same reaction conditions and using the same reaction tube, the production rate of butyrolactone was 18 percent when the average reaction was was 2.0 seconds and was only nine percent when the reaction time was 1.0 second.

EXAMPLE 2

106 g. (1 mol) of sodium carbonate were dissolved in 1 liter of water. 288 g. (1 mol) of zinc sulfate dissolved in 1 liter of water were gradually added thereto. Then an aqueous solution prepared by dissolving 133 g. (1.33 mols) of chromium trioxide in 200 ml. of water was dropped into it. Further, an aqueous solution prepared by dissolving 667 g. (2.68 mols) of copper sulfate in 1.5 liters of water was dropped into the resulting solution. After the formation of carbon dioxide ended, 1 liter of an aqueous solution containing 213 g. of caustic soda was further added. The precipitate produced was washed eight times, each time with 3 liters of water, dried at 120° C. overnight, crushed and then roasted at 450° C. for three hours. The yield was 345 g. Four percent graphite was added to it and the mixture was molded into tablets 4 mm. in diameter x 4 mm. 46 ml. (60 g.) of the tablets were put into the second step reaction tube.

Separately, 175 g. of diatomaceous earth and 447 g. (1.51 mols) of zinc nitrate were added to 1 liter of water. 160 g. of sodium carbonate dissolved in 2.5 liters of water were added to it. The solid produced was filtered and washed once with water. A solution prepared by dissolving 50 g. (0.5 mol) of chromium trioxide in 1 liter of water was added to it. Further, 242 g. 1.0 mol) of copper nitrate were dissolved in 1 liter of water and were added. The product was washed three times, each with 3 liters of water and was dried, crushed and roasted. The yield was 286 g. Four percent graphite was added to it and the mixture was molded into tablets 4 mm. in diameter x 4 mm. 65 g. (71 mols) of the tablets were put into the first step reaction tube. Nitrogen was passed at a pressure of 0.5 kg./cm.$^2$ and at a volumetric rate of 98 liters per hour through a reaction apparatus made by connecting the first step reaction tube and the second step reaction tube with each other. The temperature was elevated from 28° C. to 170° C. over a period of two hours and 35 minutes. Then hydrogen in a volume ratio of 1:30 to nitrogen was mixed in. The temperature was elevated to 205° C. over a period of one hour and 40 minutes, passing nitrogen containing hydrogen at a volumetric rate of 108 liters per hour. Finally, only hydrogen was passed at a volumetric rate of 198 liters per hour and the reduction was continued at about 190° C. for one hour.

The average total staying time in both reaction tubes of a mixed gas of maleic anhydride and hydrogen at a mol ratio of 1:17 was made 4.4 seconds. The temperature of the first step reaction tube was made 236° to 248° C. and the temperature of the second step reaction tube was made 282° to 288° C. The reaction pressure was made 1.0 kg./cm.$^2$. When a continuous reaction was carried out for 720 hours (corresponding to a total supply of 18 kg. of maleic anhydride) under these conditions, the average yield of butyrolactone was 63 percent, the selectivity was 94 percent and thus the permanence of the catalytic activity was shown.

EXAMPLE 3

772 g. (6.15 mols) of zinc carbonate were suspended in 1 liter of water. 1450 g. (6.0 mols) of copper nitrate were dissolved in 1 liter of water and dropped into the zinc carbonate suspension. The resulting solid was filtered, washed with 6 liters of water, dried and then heated at 450° C. for three hours. It was mixed with an aqueous solution of 214 g. (2.14 mols) of chromium trioxide dissolved in 0.5 liter of water. The product was dried. Four percent graphite was added to it. The mixture was molded into tablets 4 mm. in diameter x 4 mm. in depth. The tablets were further heated at 450° C. for two hours. A yield of 635 g. was obtained. 190 g. (150 ml.) of the product were put into a reaction tube. The catalyst was reduced under the same conditions as in Example 1. Then, a mixed gas of succinic acid and hydrogen at a mol ratio of 1:20 was passed into contact with the catalyst at 285° C. under a pressure of 1.1 kg./cm.$^2$ for an average staying time of 3.1 seconds. In a reaction time of one hour (corresponding to 41.6 g. of succinic acid), the product contained 75 percent butyrolactone and the selection rate was 97 percent.

EXAMPLE 4

In a reaction tube charged with 190 g. (150 ml.) of the catalyst used in Example 3, a mixed gas of fumaric acid and hydrogen of a mol ratio of 1:52 was passed into contact with the catalyst at a temperature of 250° C. under a pressure of 1.1 kg./cm.$^2$ for an average staying time of 3.0 seconds. In a reaction time of one hour (corresponding to 20.5 g. of fumaric acid), the yield of butyrolactone was 58 percent and the selection rate was 90 percent.

EXAMPLE 5

An unreduced catalyst was prepared under exactly the same conditions as in the preparation of the catalyst used in the second step reaction tube of Example 2 except that an equivalent amount of caustic soda was used instead of sodium carbonate and it was reduced in the same manner as in Example 1. The hydrogenation reaction of succinic anhydride was carried out under the same conditions as in Example 1, except with the use of this catalyst. When the average staying time was 2.0 seconds, the yield of butyrolactone was 79 percent.

The pressures referred to in the foregoing description are gauge pressures.

The embodiments of the invention in which an exclusive property or privilege is claimed are defined as follows:

1. A process for producing gamma-butyrolactone which comprises catalytically hydrogenating, in the vapor phase, at a temperature within the range of about 180° to 350° C. and at a pressure within the range of about 0.1–5 kg./cm.$^2$, a material selected from the group consisting of maleic anhydride, maleic acid, succinic anhydride, succinic acid, fumaric acid and mixtures thereof, the mol ratio of the material to be hydrogenated to hydrogen being in the range of about 1:5 to 1:100, in the presence of a zinc-chromium-copper catalyst, the reactants having an average contact time with the catalyst within the range of about 0.5 to 10 seconds, the catalyst being produced by reacting a zinc compound selected from the group consisting of zinc carbonate, zinc hydroxide, zinc oxide and mixtures thereof, chromium trioxide and a soluble copper salt in a mol ratio of 3 mols of Zn, 1 to 10 mols of Cu and 0.5 to 10 mols of Cr, calculated as the metals, to form a precipitate, water-washing, drying, roasting and then reducing said precipitate.

2. The process as claimed in claim 1, wherein said hydrogenating reaction is carried out at a temperature of 240° to 300° C.

3. The process as claimed in claim 1, wherein a double-bond containing material selected from the group consisting of maleic anhydride, maleic acid and fumaric acid is hydrogenated in two steps, the reaction temperature of the first step being 180° to 290° C. and the reaction temperature of the second step being 220° to 330° C.

4. The process as claimed in claim 1, wherein a double-bond containing material selected from the group consisting of maleic anhydride, maleic acid and fumaric acid is hydrogenated in two steps, the reaction temperature of the first step being 220° to 260° C. and the reaction temperature of the second step being 260° to 310° C.

5. The process as claimed in claim 1, wherein the mol ratio of said material to be hydrogenated to hydrogen is between 1:10 and 1:30.

6. The process as claimed in claim 1, wherein the mol ratio of Zn, Cu and Cr is 3 mols of Zn, 2 to 8 mols of Cu and 1 to 4 mols of Cr.

References Cited

UNITED STATES PATENTS

| | | | |
|---|---|---|---|
| 1,809,978 | 6/1931 | Larson | 252—468 |
| 1,959,313 | 5/1934 | Vain | 252—468 |
| 2,512,653 | 6/1950 | Kapecki | 252—468 |
| 3,113,138 | 12/1963 | Franko-Filipasic | 260—343.6 |

OTHER REFERENCES

Berkman, S., et al., Catalysis: Inorganic and Organic, 1940, pp. 274–276, 283–289, 818, 750, 809, 813.

ALEX MAZEL, Primary Examiner

A. M. T. TIGHE, Assistant Examiner

U.S. Cl. X.R.

252—468